3,482,949
NEPTUNIUM SEPARATION FROM URANIUM
La Verne E. Trevorrow, Glen Ellyn, Thomas J. Gerding, Downers Grove, and Martin J. Steindler, Park Forest, Ill., assignors to the United States of America as represented by the United States Atomic Energy Commission
No Drawing. Filed June 11, 1968, Ser. No. 736,033
Int. Cl. B01d 53/00; C01g 56/00, 43/06
U.S. Cl. 23—326                                        4 Claims

ABSTRACT OF THE DISCLOSURE

Neptunium hexafluoride is separated from mixtures of neptunium hexafluoride and uranium hexafluoride by preferentially reducing the neptunium hexafluoride with bromine to solid neptunium tetrafluoride.

CONTRACTUAL ORIGIN OF THE INVENTION

The invention described herein was made in the course of, or under, a contract with the U.S. Atomic Energy Commission.

BACKGROUND OF THE INVENTION

This invention relates to a process for separating neptunium from uranium and more specifically to a process in which gaseous mixtures of neptunium hexafluoride and uranium hexafluoride are reacted with bromine which preferentially reduces the neptunium hexafluoride to solid neptunium tetrafluoride.

A fluoride volatility process is being developed to reprocess spent nuclear fuels and recover unused uranium and plutonium. At some point in the process a uranium stream is produced which contains uranium hexafluoride as well as various volatile fission product fluorides. Neptunium hexafluoride is present in addition to the volatile fission product fluorides and must be removed from the uranium hexafluoride stream prior to reprocessing of the uranium into fuel. Heretofore, there has not been a convenient one-step process for the separation of neptunium from uranium.

SUMMARY OF THE INVENTION

It has been discovered that bromine reduces neptunium hexafluoride to a solid neptunium tetrafluoride. This discovery has enabled a simple one-step process to be designed in which a mixture of neptunium hexafluoride and uranium hexafluoride is reacted with bromine to preferentially reduce neptunium hexafluoride to solid neptunium tetrafluoride while the volatile uranium hexafluoride remains unaffected.

DESCRIPTION OF THE PREFERRED EMBODIMENT

The invention may be better understood by reference to the following experiments in which mixtures of uranium hexafluoride and neptunium hexafluoride were prepared by condensing, into a nickel bulb, samples previously measured by standard pressure-volume-temperature techniques. The hexafluorides were allowed to mix in the bulb for at least 15 hours. A sample of the mixture was then isolated, measured and condensed into a reaction tube. A measured sample of bromine was condensed on to the mixture at $-78°$ C. The resulting liquid mixture was warmed and held at the chosen reaction temperature for various lengths of time. The volatile reaction products were distilled from the reaction tube and collected. Both the volatile and nonvolatile fractions were dissolved in an aqueous 6 N nitric acid-0.1 N aluminum nitrate and the resulting solutions were analyzed for uranium and neptunium. Results of these experiments are reported in the following table:

TABLE

| Exp. | Reaction temp., °C. | Reaction time | Initial composition MF$_6$ mixture | | Distribution of U and Np after reaction | | | | Np in nonvolatile fraction (Percent of total Np found by analysis) |
|---|---|---|---|---|---|---|---|---|---|
| | | | | | Volatile fraction | | Nonvolatile fraction | | |
| | | | Np (mg.) | U (mg.) | Np (mg.) | U (mg.) | Np (mg.) | U (mg.) | |
| 1 | 30 | 30 min | 126 | 170 | 1.73 | 169 | 144 | 0.70 | 98.6 |
| 2 | 30 | 30 min | 126 | 169 | 70.7 | 171 | 71.6 | 0.81 | 50.3 |
| 3 | 30 | 40 min | 122 | 164 | 89.4 | 167 | 49.2 | 0.56 | 35.5 |
| 4 | 30 | 16 hr | 153 | 164 | 20 | 158 | 134 | 2.5 | 87 |
| 5 | 30 | 40 hr | 140 | 150 | 5.9 | 144 | 134 | 3.85 | 96 |
| 6 | 25 | 60 min | 164 | 178 | 76 | 170 | 86.8 | 1.35 | 53 |
| 7 | 75 | 60 min | 156 | 170 | 0.05 | 161 | 112 | 3.77 | 99.9 |
| 8 | 75 | 60 min | 109 | 168 | 0.05 | 160 | 122 | 7.0 | 99.9 |
| 9 | 75 | 60 min | 109 | 168 | 0.03 | 164 | 117. | 2.32 | 99.6 |

The results show that the reaction at room temperature in Experiment 6 results in an incomplete reduction of the neptunium hexafluoride. The last 3 experiments, 7 through 9 inclusive, show that reaction at 75° C. following a 1 hour mixing time of the liquid reactants produces an essentially complete reduction of the neptunium hexafluoride. Experiments 7-9 show that while some uranium may be reduced concurrently with the neptunium tetrafluoride, a gross separation of uranium and neptunium is possible with this process.

It will be understood that the invention is not to be limited to the details given herein but that it may be modified within the scope of the appended claims.

The embodiments of the invention in which an exclusive property or privilege is claimed are defined as follows:

1. A process for separating uranium hexafluoride from a mixture containing uranium hexafluoride and neptunium hexafluoride comprising: contacting the mixture in the gaseous state with bromine to preferentially reduce the neptunium hexafluoride to solid neptunium tetrafluoride and thereafter separating the gaseous uranium hexafluoride from the solid neptunium tetrafluoride.

2. The process of claim 1 wherein the uranium hexafluoride, neptunium hexafluoride and bromine are maintained during the neptunium reduction at a temperature greater than room temperature.

3. The process of claim 2 wherein the mixture containing uranium hexafluoride and neptunium hexafluoride is condensed prior to contact with bromine and further comprising the step of, after contacting the condensed uranium hexafluoride and neptunium hexafluoride with bromine, heating the reactants of uranium hexafluoride, neptunium hexafluoride and bromine to the reaction temperature and maintaining the reactants at that temperature.

4. The process of claim 3 wherein the reactants are maintained at a temperature of about 60° C. for about 1 hour.

References Cited

UNITED STATES PATENTS 3,374,068  3/1968  Erlandson _____ 23—326

OTHER REFERENCES

Trevanow & Gerding, Neptunium Fluoride Chemistry, ANL-7375, pp. 64–66, October 1967.

LELAND A. SEBASTIAN, Primary Examiner

U.S. Cl. X.R.

23—343